Aug. 25, 1953     P. S. FARLEY     2,650,002
APPARATUS FOR FEEDING FIBROUS MATERIAL
Filed July 27, 1948
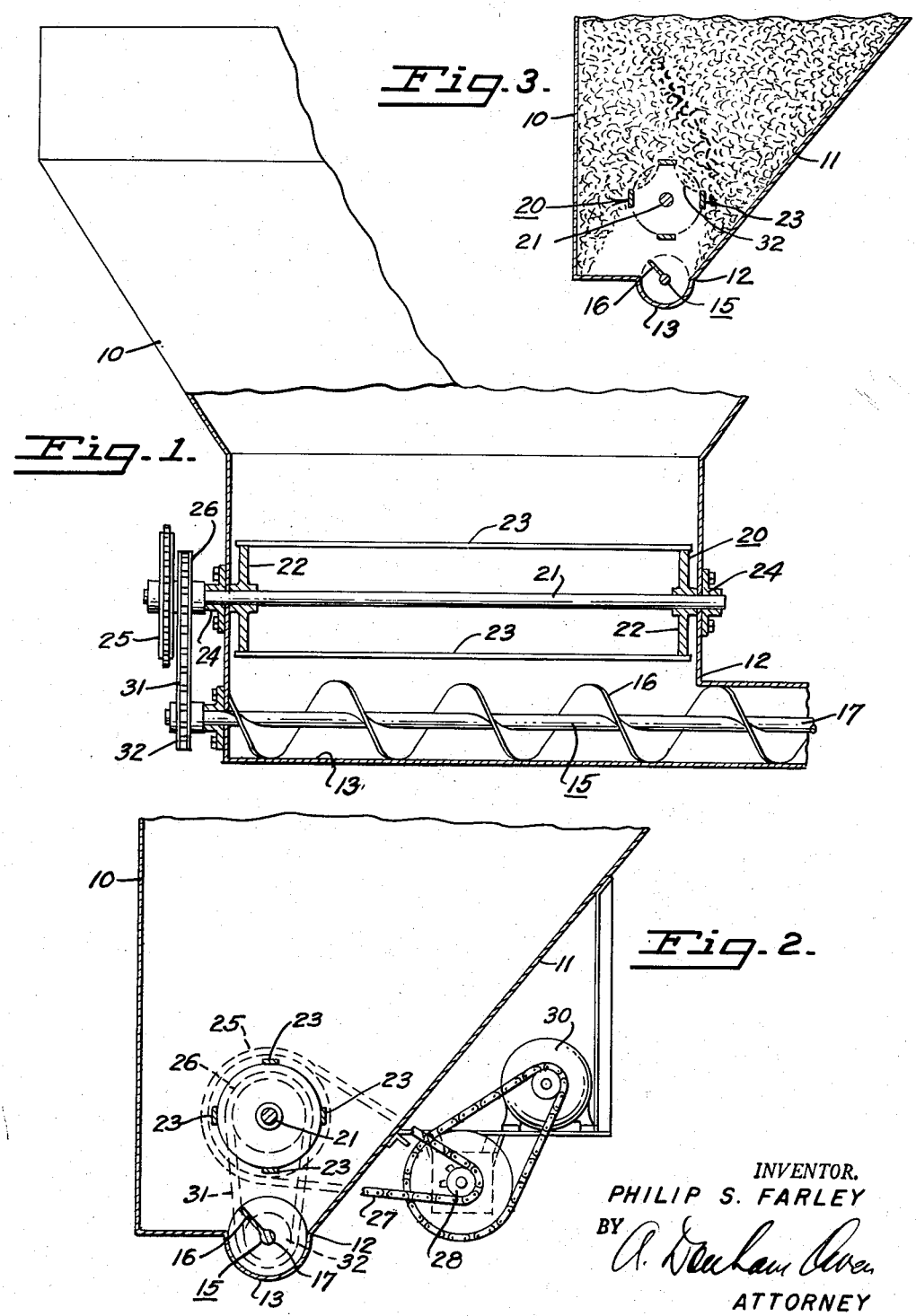
INVENTOR.
PHILIP S. FARLEY
BY
ATTORNEY Patented Aug. 25, 1953

2,650,002

UNITED STATES PATENT OFFICE 2,650,002

APPARATUS FOR FEEDING FIBROUS MATERIAL

Philip Sidney Farley, Oakland, Calif., assignor to Noble Co., Oakland, Calif., a corporation of California Application July 27, 1948, Serial No. 40,906

1 Claim. (Cl. 222—238)

This invention relates to an apparatus for feeding fibrous material such as scrap asbestos fibres from a storage bin.

In the manufacture of products employing subdivided asbestos, there is usually a large amount of reusable scrap from the trimming operations. When this scrap was re-ground and the separated fibres placed in a storage bin, it was found that it cohered tightly and packed together. It then became impossible to get it to feed out of the bottom of the bin and onto the production line. Screw feed conveyors operated in the bottom of the bin, had proven satisfactory with other materials, but with these fibres the conveyor merely ate out a small hole in the packed mass of scrap fibres, and the scrap above that hole remained arched and would not fall down into the path of the screw blades. Similar experiences were encountered when other types of agitators were used—whether they were placed vertically or horizontally. Before the present invention the problem of feeding fibrous scrap out of a bin had not been solved. Efforts to do it mechanically had been abandoned. The general practice was to pack the scrap fibres in sacks from which several laborers dumped the material at the right intervals, or men with long poles would push the scrap down inside the bin into the path of the conveyor blades. The characteristic of this material is such that if a quantity of it is placed in a four sided bin and one side of the bin is removed the material will not flow out but will retain practically a straight vertical line. It has a matting characteristic similar to the dirt picked up in a household vacuum cleaner bag.

An important object of the invention is to gain the economies possible with a fully automatic feeding apparatus for use with self-cohesive materials such as subdivided asbestos fibre and fibre scrap.

Another object of the invention is to provide a feed means for use in a bin, which will operate continuously to feed material down onto a conveyor system.

Another problem in handling this type of fibre is that it seems to mat together worse if allowed to stand for a time, therefore, a further object of the invention is to provide a novel agitator feed-conveyor combination which is not affected by shut-downs and which when started again, will immediately begin to feed material out of the bin. This is important because in making shingles where proportions are definite a lag in the feeding of any element will mean some defective material until the materials are being fed in correct proportions.

Another object of the invention is to provide an agitator-feeder which will not simply eat a hole in the adjacent packed asbestos fibre, but which will keep the material above it moving downwardly so that a large bin may be completely emptied.

Other objects and advantages of the invention will appear from the following description and from the drawings. Although a preferred form is described in detail, in accordance with U. S. Revised Statutes, Section 4888, it is not intended thereby to limit the scope of the claim.

In the drawings:

Fig. 1 is a view in front elevation and partly in section of a bin including a device embodying the principles of the invention;

Fig. 2 is a view in side elevation and in section of the lower part of Fig. 1; and Fig. 3 is a diagrammatic view of the inside of the bin intended to show about what occurs.

Generally the invention is used in connection with a bin which is wide at the top and relatively long and narrow at its lower end. It combines in the bin a screw feed conveyor to carry the material out of the bin and an agitator placed near and above the conveyor. Three important relations and features are involved: (1) The agitator is linked in tandem with the screw conveyor so that when one of them is running they are both running, and when one stops they both stop. (2) The agitator is positioned near the conveyor and drops the scrap almost directly into the conveyor. (3) The agitator is a specially made open-type of drum, with its slats spaced well apart, so that the scrap can be knocked off by the slats and then dropped through the spaces between the slats. An agitator with closely spaced slats affords too much support to the matted material above it and the material is not knocked loose.

As shown in the drawings, it is preferable that the bin 10 be of the type which has at least one wall 11 sloping in at its bottom end 12, so that at 12 there may be a relatively long, narrow channel 13. In this channel 13 is a helical screw conveyor 15, which may be of conventional design, comprising a wide screw blade 16 wound around and rigidly secured to a shaft 17.

Directly above the conveyor 15 is positioned an agitator 20, comprising a shaft 21, two wheels 22 (which may be disc-type or spoke-type), and a plurality of spaced-apart slats 23. Preferably the slats 23 are narrow. They may be simply steel rods, and three or four is an ample number. An important thing is to have the space between the slats wide enough that the material being supported and fed thereby will not arch over between adjacent slats in an arch substantially corresponding in shape to the path of the slats and thus not extend down between the slats.

The shaft 21 extends outside the bin 10, being journaled in the walls at 24. At one end is secured a pair of sprocket wheels 25 and 26. The wheel 25 is connected by a drive chain 27 to a sprocket wheel 28 driven by a motor 30. The wheel 26 is joined by a chain 31 to a sprocket wheel 32 on the conveyor shaft 17, so that the shafts 17 and 21 are linked for movement together. It is apparent that the driven wheel 25 could be on shaft 17 instead of shaft 21 and that the relative speed of the two shafts may be determined by the ratio of the wheels 26 and 32.

When the motor 30 is started, both the agitator 20 and conveyor 15 are moved, at the same or related speeds. As the slats 23 are carried around and around below the scrap in the bin 10, they agitate and knock some of the fibres loose. These pieces fall down through the open drum agitator 20 into the screw conveyor 15. The conveyor 15 then carries them off. Because the agitator 20 and conveyor 15 move together, there is no likelihood of either one becoming plugged. The conveyor 15 carries off what the agitator 20 knocks loose, and the agitator's narrow slats 23 continue agitation of the material causing it to drop through the slats into the conveyor 15. Due to this manner of operation there is no packing or arching of scrap around either the agitator or the conveyor. The scrap above the agitator is supported by the outer sides of the slats 23 at points so widely spaced that the scrap dips down at 32 between the relatively narrow sides of these slats. Thus the instant the blades start moving, the material is in position to be hit by the slats and some of it is knocked loose or dislodged from that above it. Like material falls down into position between the slats as the slats rotate. What I believe to be the condition inside, just before the agitator is started is shown diagrammatically in Fig. 3. Whatever fibre material may be present in the feed screw and above it has been omitted from the drawing to avoid confusion with the lines 32.

During rotations of the drum, the material probably does not have time to move into the path of the slats as fast as it does when the drum is at rest. The dot-dash line represents the path of the slats 23.

I claim:

An apparatus for continuously feeding self-cohesive materials such as subdivided asbestos fibre, comprising a bin having oppositely disposed ends, at least one sloping side and a bottom, said bottom having a depending trough formed as a portion thereof and extending longitudinally of said bin, a screw conveyor rotatably mounted in said trough, bearing means in said bin for said conveyor, material supporting and feeding means rotatably mounted in said bin directly above said conveyor, bearing means on said bin for said material supporting and feeding means, said material supporting and feeding means including a shaft supported by said last mentioned bearing means and extending longitudinally of said bin, supporting wheels fixed on said shaft adjacent the inner opposite ends of said bin, a plurality of material supporting and dislodging slats fixed at their ends to said wheels, and comprising the only material supporting means between said wheels, said slats being substantially rectangular in cross-section with their wider sides contacting said wheels to support the material temporarily suspended between said slats as the relatively narrow sides of the slats engage and loosen the self-cohesive material in the bin, to drop through the material supporting and feeding means directly into said screw conveyor, and means for simultaneously driving said screw conveyor and said material supporting and feeding means.

PHILIP SIDNEY FARLEY.

References Cited in the file of this patent

UNITED STATES PATENTS

| Number | Name | Date |
|---|---|---|
| 878,536 | Kennebrew | Feb. 11, 1908 |
| 1,005,767 | Bickerstaff | Oct. 10, 1911 |
| 1,071,482 | Umholtz | Aug. 26, 1913 |
| 1,256,854 | Wickliffe | Feb. 19, 1918 |
| 1,634,741 | Decoteau | July 5, 1927 |
| 1,912,988 | Masters | June 6, 1933 |
| 2,442,743 | Webster | June 1, 1948 |